Dec. 2, 1947. W. E. KAISER 2,431,758
AUXILIARY PROPULSION MEANS FOR COMBINES OR THE LIKE
Filed April 27, 1945

INVENTOR.
WILLIAM E. KAISER
BY F. Ledermann
ATTORNEY

Patented Dec. 2, 1947

2,431,758

UNITED STATES PATENT OFFICE 2,431,758

AUXILIARY PROPULSION MEANS FOR COMBINES OR THE LIKE

William E. Kaiser, Bison, Kans.

Application April 27, 1945, Serial No. 590,661

1 Claim. (Cl. 180—14)

This invention relates to power propulsion means, and aims more particularly to provide such means for aiding in the propulsion of a modern conventional type of combine for the purpose of assisting traction by turning the wheel which has the greatest weight and resistance, the attachment being connected to the power take-off of a light tractor. The device should be readily adaptable to any common make of harvester.

The trend in the production of tractors appears to be in the direction of ever lighter machines. Yet a combine simply must be moved about when it is time to harvest the grain even if the field is soft and heavy. Now that the threshing and harvesting units are mounted on trucks, the latter require additional or auxiliary power to move the outfit around the field. The present invention, it is believed, should solve the above difficulty.

The above and other objects will become apparent in the following description, wherein characters of reference refer to like-numbered parts in the accompanying drawings. It is to be noted that the drawings are intended to serve the purpose of illustration only, and that it is neither intended or desired to limit the invention necessarily to the specific details of construction shown excepting insofar as they may be deemed essential to the invention.

Referring briefly to the drawings.

Figure 1:
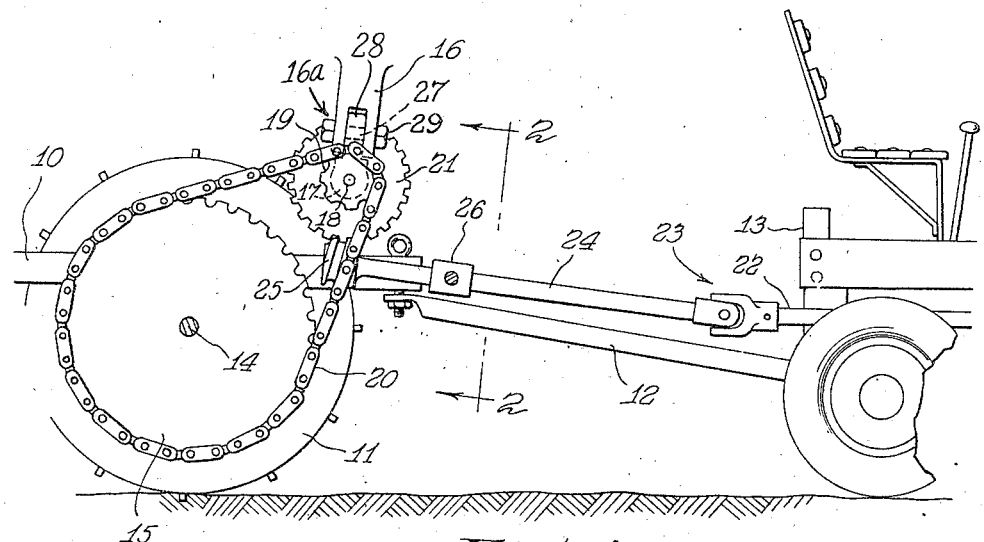
Fig. 1 is a fragmentary side elevational view of a combine truck and a tractor, illustrating the power attachment on the truck and its engagement with and operation by the power take-off of the tractor.

Referring in detail to the drawings, the numeral 10 indicates a portion of the body or chassis of a truck having the harvesting unit, not shown, mounted thereon, and 11 indicates one of the wheels of the truck, or, more particularly, the main wheel of the harvester-thresher. A hitch 12 may be used to join the tractor 13 to the truck frame 10.

The truck wheel 11 has its propulsion shaft 14 rigid therewith, and rigid on this shaft is a gear 15. A forked bracket 16, secured rigidly to a portion, not shown, of the truck body, pivotally supports at 16a a sleeve-like housing 17 having a shaft 18 axially mounted therein. On one end of this shaft a cog or pinion 19 is rigidly mounted, and a sprocket chain 20 is trained about the cog 19 and the gear 15. On the other end of the shaft 18 is a worm wheel or pinion 21.

The power take-off shaft 22 of the tractor is shown provided with a universal joint 23 joining the same to a drive shaft 24 which has a worm 25 on its extremity in engagement with the worm wheel 21. The shaft 24 passes through a support 26 rigidly secured to some part of the truck frame, not shown.

Figure 2:
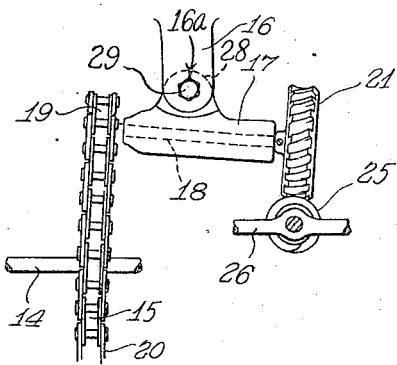
Fig. 2 is a sectional view taken on the line 2—2 of Fig. 1.

The pivotal mounting 16a comprises a bolt 27 passing through the forked bracket 16 and the tongue 28 of the housing 17. Loosening of the nut 29 of the bolt permits swinging of the housing 17 in a counter-clockwise direction (Fig. 2) to disengage the worm wheel 21 from the worm 25, when the auxiliary traction means is not to be used, and the chain 20 may then be entirely removed. Reverse swinging of the housing 17 and then tightening the nut, causes tightening of the chain and interengagement between the worm and wheel. This feature of disengageability is provided because it is not necessary at all times to apply the auxiliary tractive power to the combine.

It is apparent that, with the power transmission thus established between the power take-off 22 and the wheel 11 through the shaft 24, worm 25, worm wheel 21, shaft 18, pinion 19, chain 20 and gear 15, the truck wheel 11 will be given added tractive power, and with this added power the truck may be freely propelled around a soft and heavy field over which its own power source would be insufficient to move it.

Although the hitch 12 is not absolutely essential, it should nevertheless be desirable as a means of avoiding excessive strain on the drive shaft 24.

With the utilization of the invention above set forth the truck may be used at any time on any condition of field just at the proper moment for harvesting.

Obviously, modifications in form and structure may be made without departing from the spirit and scope of the invention.

I claim:

The combination between a vehicle having a traction wheel and a tractor having an auxiliary power take-off shaft, comprising a forked bracket secured to the vehicle, a sleeve-like housing secured in said forked bracket and having a rotatable shaft extending axially therethrough, said shaft having a pinion rigid on one end and a worm wheel rigid on the other end thereof, a shaft rigid with said vehicle wheel, a gear rigid on said second-named shaft, a sprocket chain trained about said pinion and gear, a shaft connected with and actuated by said take-off shaft, said last-named shaft having a worm thereon in mesh with said worm wheel, and a bolt and nut means adapted to adjustably secure said housing in said forked bracket whereby said housing may be pivotally adjusted on the bracket, to a position in which said worm wheel and gear at the ends of said second named shaft respectively mesh with said worm and tighten said chain to transmit drive to said vehicle wheel.

WILLIAM E. KAISER.

REFERENCES CITED

The following references are of record in the file of this patent:

UNITED STATES PATENTS

| Number | Name | Date |
|---|---|---|
| 1,322,335 | Petersen | Nov. 18, 1919 |
| 1,926,935 | Bottini | Sept. 12, 1933 |
| 1,537,040 | Virgens | May 5, 1925 |
| 1,706,742 | Raimer et al. | Mar. 26, 1929 |